(12) United States Patent
Lyakir et al.

(10) Patent No.: US 6,994,394 B1
(45) Date of Patent: Feb. 7, 2006

(54) AUTOMOBILE BODY PERFORMING DECREASED AERODYNAMIC LIFT

(76) Inventors: Vitaliy Lyakir, 4015 Atlantic Ave., Brooklyn, NY (US) 11224; Alla Litovchenko, 855 Great Plain Ave., Needham, MA (US) 02492; Dmitry Denikin, #207 Kutztown University Pl., Box 223, Kutztown, PA (US) 19530

( * ) Notice: Subject to any disclaimer, the term of this patent is extended or adjusted under 35 U.S.C. 154(b) by 4 days.

(21) Appl. No.: 10/894,175

(22) Filed: Jul. 20, 2004

Related U.S. Application Data (63) Continuation-in-part of application No. 10/443,169, filed on May 23, 2003, now abandoned.

(51) Int. Cl.
*B60J 1/00* (2006.01)

(52) U.S. Cl. ................. 296/180.1; 296/180.5

(58) Field of Classification Search ............ 296/180.1, 296/181.5, 181.1, 64, 65.05, 180.5
See application file for complete search history.

(56) References Cited

U.S. PATENT DOCUMENTS

| | | | | |
|---|---|---|---|---|
| 3,026,066 A | * | 3/1962 | Coates | 244/12.1 |
| 3,776,587 A | * | 12/1973 | Oxlade | 296/180.5 |
| 3,982,787 A | * | 9/1976 | Moll | 296/65.13 |
| 4,313,511 A | * | 2/1982 | Soo Hoo | 180/21 |
| 4,624,469 A | * | 11/1986 | Bourne, Jr. | 280/62 |
| 4,625,825 A | * | 12/1986 | Ethier | 180/24 |
| 4,778,130 A | * | 10/1988 | Kim | 244/53 R |
| 4,881,701 A | * | 11/1989 | Bullard | 244/49 |
| 4,986,493 A | * | 1/1991 | Sarh | 244/50 |
| 5,042,870 A | * | 8/1991 | Yura | 296/180.1 |
| 5,056,860 A | * | 10/1991 | Cornacchia et al. | 296/180.5 |
| 5,146,203 A | * | 9/1992 | Simuni | 296/180.1 |
| 5,259,571 A | * | 11/1993 | Blazquez | 244/12.2 |
| 5,407,245 A | * | 4/1995 | Geropp | 296/180.1 |
| 5,833,256 A | * | 11/1998 | Gilmore | 280/224 |
| 5,924,763 A | * | 7/1999 | Daniels | 296/180.1 |
| 6,042,052 A | * | 3/2000 | Smith | 244/105 |
| 6,129,306 A | * | 10/2000 | Pham | 244/50 |
| 6,167,829 B1 | * | 1/2001 | Lang | 114/278 |
| 6,170,847 B1 | * | 1/2001 | Pham | 280/298 |
| 6,230,836 B1 | * | 5/2001 | Cowan et al. | 296/180.1 |
| 6,378,932 B1 | * | 4/2002 | Fasel et al. | 296/180.1 |
| 6,896,309 B2 | * | 5/2005 | Satoh et al. | 296/65.09 |

* cited by examiner

Primary Examiner—Kiran B. Patel (57) ABSTRACT

Automobile body performing with reduced aerodynamic lift while speeding, and therefore having its fuselage shape of a parallelogram with acute angle. The fuselage is made with roof projected straight backward and also having its body rear plate, slanted upward toward its car's rear end to create a body of parallelogram shape at the side section. Reducing aerodynamic lift, which normally occurs while car is moving at a high speed, will happen when separation of air flow around the top and bottom of the car's body will distributed with less than a standard difference in length, speed, and air density of both parts, and will result in more or less equality in air pressure occurring around the top and bottom of the automobile fuselage. Such an air flow redistribution allow lower air drug with higher profile of the vehicle fuselage and more control over a speeding vehicle. Rear compartment design allow to combine it with trunk, also achieve better safety of rear side in collision, as well as passenger on rear seats due to passenger hamstrings fixed position, and geting more comfort for passenger by interior envelop space redistribution.

7 Claims, 8 Drawing Sheets

AUTOMOBILE BODY PERFORMING DECREASED AERODYNAMIC LIFT

CROSS-REFERENCE TO RELATED APPLICATIONS

This is a continuation in part of the application Ser. No. 10/443,169 filed at May 23, 2003, now abandoned to substitute the original filing.

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

The invention pertains to the automobile fuselage design field of endeavor, and more specifically to an aerodynamicallly improved car's body. Because the air resistance to an object moving through, a regular pontoon-shaped automobile body cuts the frontal air flow, the way where two unequal major air flows are running around top and bottom of the fuselage. Due to the comparative flatness of this fueselage on the bottom side, the bottom airflow is shorter than the upper one and runs slower. Hence, an air density and pressure below the automobile bottom exceeds the same above the roof. Occurrence of such a force which called "an aerodynamic lift" (or vertical contra-gravity force) reduces vehicle stability by pulling a moving object against its gravitational force propormore even, one shall have shape with greater equality in size between its top and bottom surfaces. For instance, the body shaped as an acute angled parallelogram in its side cross-section will create desirable air pressure equality.

A conventional fuselage rear end design (box, sloping box, fastback, notch back models, etc.) is not very effective in reducing the previously described aerodynamic lift. Due to the wind approaching a compact fuselage at a higher angle than a larger one, a higher aerodynamic lift occurred in the first case at compatible speed values. As a result, a typical automobile of small classes has higher wind resistance sensitivity, and comparatively uncertain stability due to a higher ratio between cars speed and wheels/road contact comparing to larger car models.

The lack of space in the rear part of a passenger compartment of typical small classes' fuselage demands adult passengers to bend their neck. This make rear seats of those uncomfortable and affect people heals. Also, the rear compartment of this type of design has low efficiency of inner space usage and has a high drag coefficient.

Various designs to reduce front airflow resistance, drag coefficient, side-wind sensitivity are known, such as under U.S. Pat. Nos. 4,489,972 and 4,505,507. Yet a notable reduction of aerodynamic lift was achieved either by flattening of the automobile fuselage (which also limits an observation angle), or by using a spoiler of large size for increasing an airflow pressure on the fuselage's rear top (although getting an increased air drag coefficient).

BRIEF SUMMARY OF THE INVENTION

The present invention is intended as an aerodynamic lift decreasing vehicular body of an acute angled parallelogram shape in its side section of the type described introductory which exhibits the neglected volume of aerodynamic lift force in order to increase contact with the road surface of the type of vehicle in question.

The invention attains this objective in that the front-upper surface of the fuselage is made roughly equal in length to the bottom-rear surface in such a way that air flowing both ways around a car's body gets equal speed, equal density and occur equal pressure on the fuselage surface from both sides.

The point of departure for the present invention is the fact, which is in itself known, that an air flow resisting a moving car became separated by its fuselage, and here a value of an occurred air pressure on each part of the vehicle's surface is in direct proportion to the speed of air flow contacting this part.

Air pressure of this kind occurs, in particular, around conventional pontoon fuselage wherein uneven airflow separation causes a resulting air pressure contrary to gravitation. The present invention allow fuselage to create an equal horizontal airflow separation along the surface of this parallelogram-shaped body to eliminate an aerodynamic lift or perhaps to obtain a negative direction of aerodynamic lift to increase, along with a gravitational force, the moving vehicle's stability.

This fuselage quality obtained by increasing in length its bottom-rear surface and simultaneous decreasing in length its front-upper surface to make the last equal or otherwise smaller than the other, with the rear plate inclination from the rear wheel booth, placed right behind last conventional seats row, toward the upper-rear fuselage part to meet the upper plate further backward than its connection with the bottom plate. Therefore, the automobile body performing decreased aerodynamic lift is presented.

Advantages of this invention are:

Optimization of vehicle dynamic stability due to gettig the contact between vehicle wheels and road surface increased, where faster car movemen show the higher advantage of this invention comparing to conventional car models.

A more comfortable body position allowed in the rear passenger chair, because new back-seats introduce larger room for people's back and neck, to avoid a banding position.

An acute angle parallelogram shaped fuselage stroked into its back by following passenger car's sadiator allows the first to slide on top of the other. Occured along the car body's rear plate sliding reduces a Direct Striking Force and bounces it away from passenger seats. Imaginatively possible overturning is more acceptable over cars' rear compartment's banding or crushing for getting smaller the forces applied against fuselage from exterior.

Described herein above, the sliding feature of the acute angle parallelogram shaped fuselage imposes a limit on the collision forces value. Reverse ratio between the improved vehicle's rear plate durability and its weight, suggest possible achievement of such a value of the first that any collision forces value exceeding the value of improved vehicle's weight, cause lifting of this vehicle higher up, instead of allowing the fuselage rear plate to band.

BRIEF DESCRIPTION OF THE SEVERAL VIEWS OF THE DRAWING

An embodiment of the invention will be better understood by referring to the following description taken in conjunction with the accompanying drawings, in which identical reference numerals identify similar elements, and in which.

On FIG. 6 collision forces resolution shows in detail the redistribution of acting forces along the improved fuselage's surface.

Figure 4:
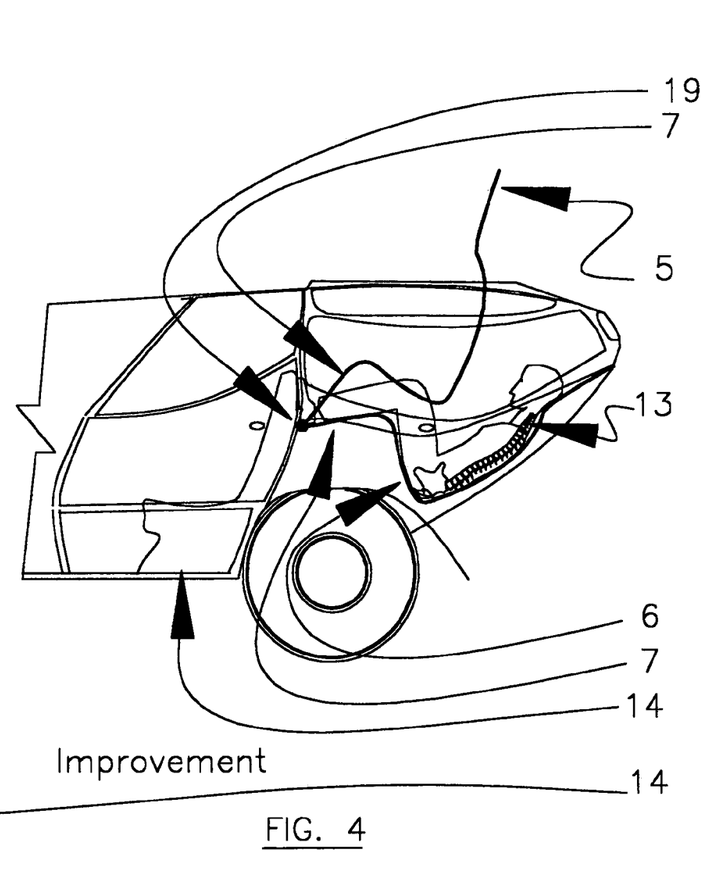
FIG. 4 is more detailed side section of an improved fuselage rear compartment which illustrates passenger's backbone improved position and location of the axle allowing rear seats to rotate around.

DETAILED DESCRIPTION OF THE INVENTION 1-2—front plate; 2-3—upper plate; 3-4—rear plate; 4-1—bottom plate; 5—first part of new back seats; 6—second part of new back seats; 7—third part of new back seats; 8—vertical rear door; 9—rear wheel booth; 10—spoiler; 11—trunk; 12—extended wheel frame; 13—backbone in the neck area; 14—conventional seat rows; 15—rear bumper; 16—vertical hock absorber; 17—passenger accident buffer zone; 18—fuselage rear plate shown interiorly, between sides of the extended wheel frame;

The present invention is the automobile fuselage designed to make uniformed in its value the airflow distribution occurring around named fuselage top and bottom and attain this by employing shorter the bottom plate (4-1), projected horizontally backward not further than the vehicle rear wheels' booth location at standard wheel frame (9), where booth is placed right after the last row of that named upper plate meets the rear plate (3-4) of named fuselage further backward than this rear plate (3-4) meets named bottom plate (4-1) so that the named rear plate (34) must be placed nearly parallel to the front plate (1-2) of named fuselage making nearly 45 degree angle to horizontal axis and further this invention comprising one or more rows of conventional seats (14), and the last row of new rear seats (5,6,7) placed around the rear wheels booth location at standard wheel frame (9) and along the rear plate curvature as it shown on FIG. 4 with the first part running from the named conventional seats nearly horizontally backward to support passenger feet and calves (5) and further running nearly vertically down to support human buttocks and upper thighs (6) while the vehicle speed is decreasing, and further the passenger seats' back situated nearly parallel to the named fuselage rear plate at nearly 45 degree angle to horizontal axis. These angles must be not limited to the named above exactly and may be conveniently modified within a range of lesser than 45 degree.

The rear wheels can be extended further back from the bottom plate on the wheel frame extenuation, preferably having the rear bumper, the way that the lower airflow (L2) able running between the wheel booth and the fuselage.

Figure 1:
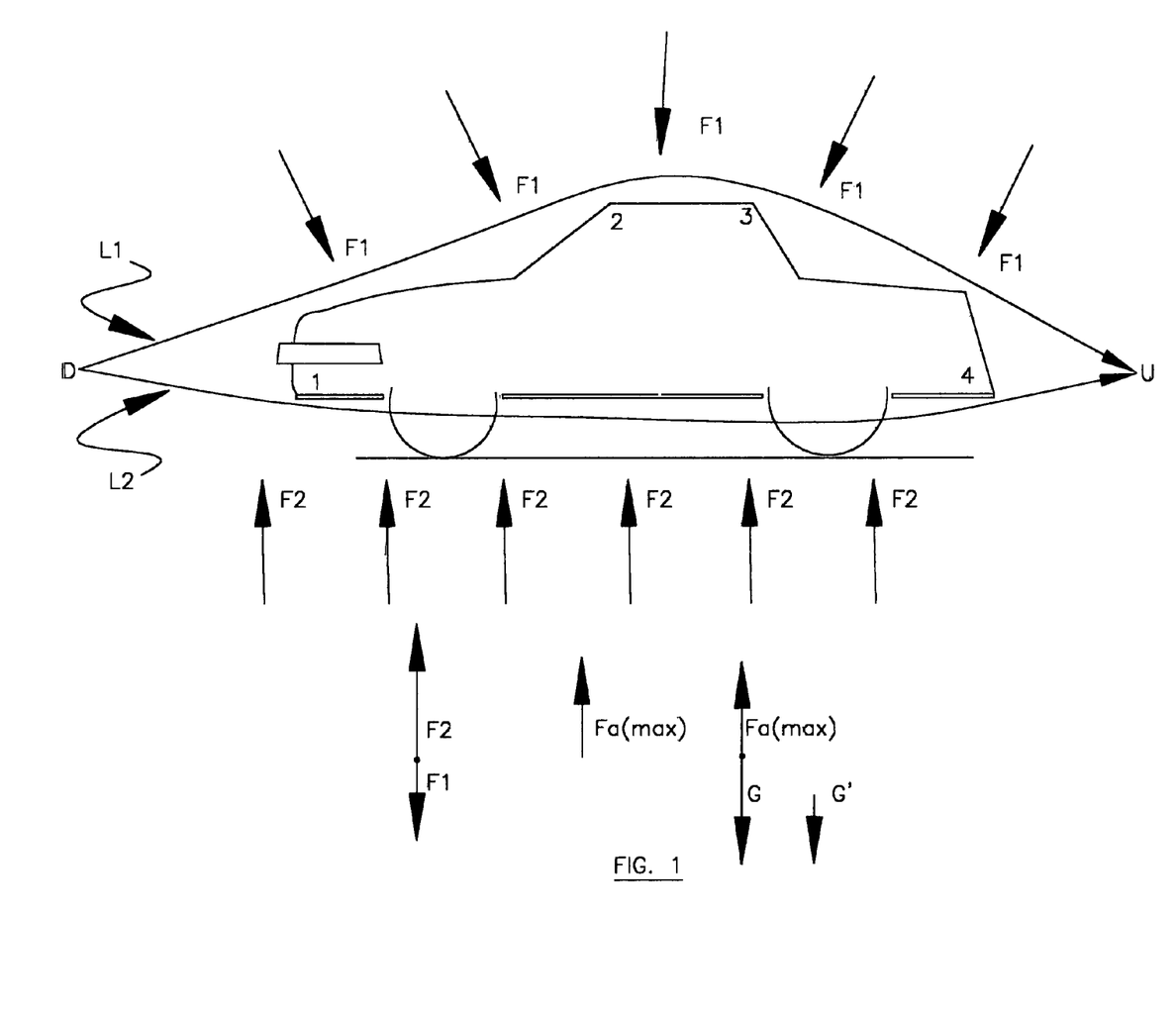
FIG. 1 is the side section of typical pontoon fuselage and schematically illustrates an aerodynamic lifting force occurring to a car body.
Figure 2:
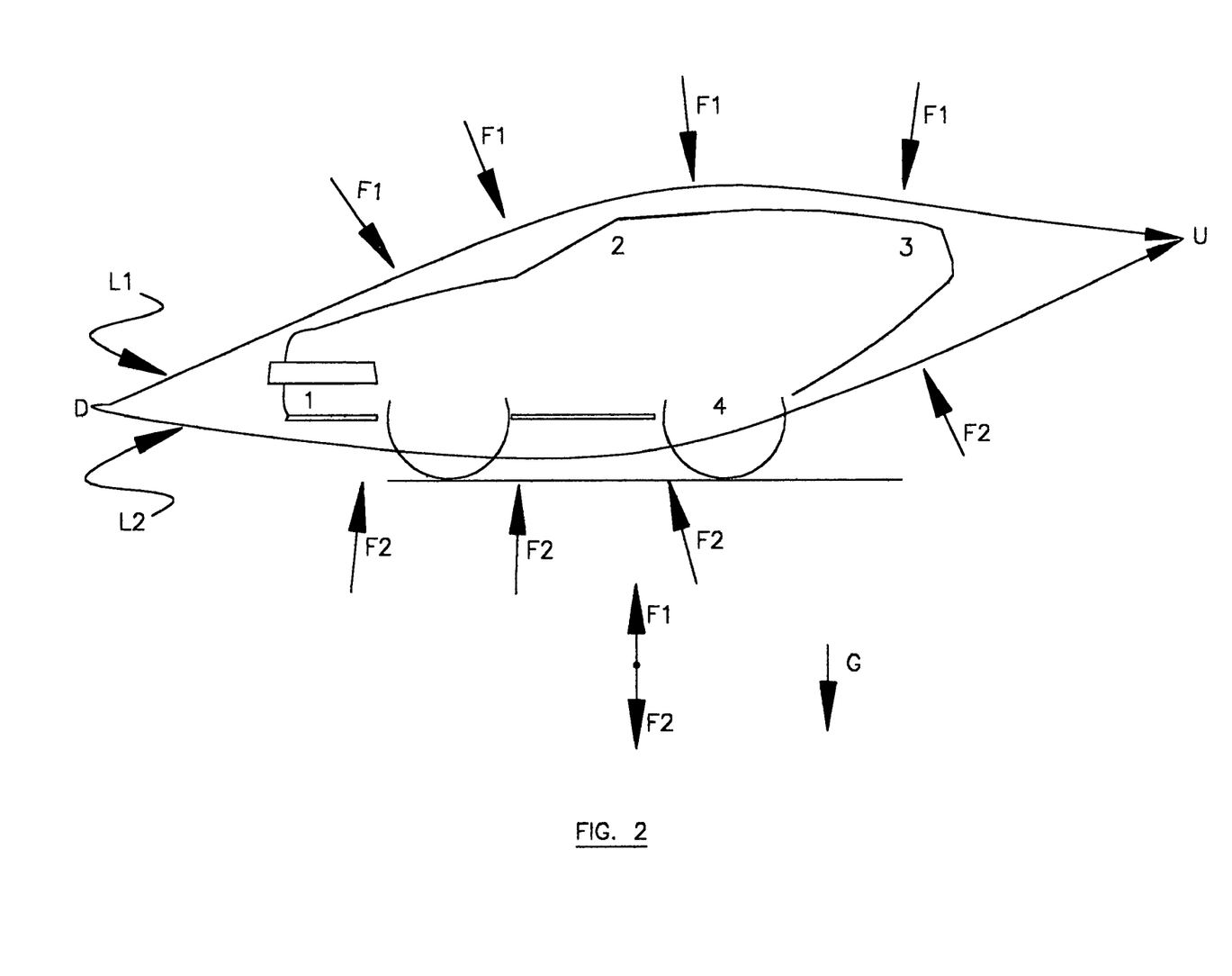
FIG. 2 is the side section of improved fuselage of acute angle parallelogram shape and schematically illustrates aerodynamic lift elimination.
Figure 3:
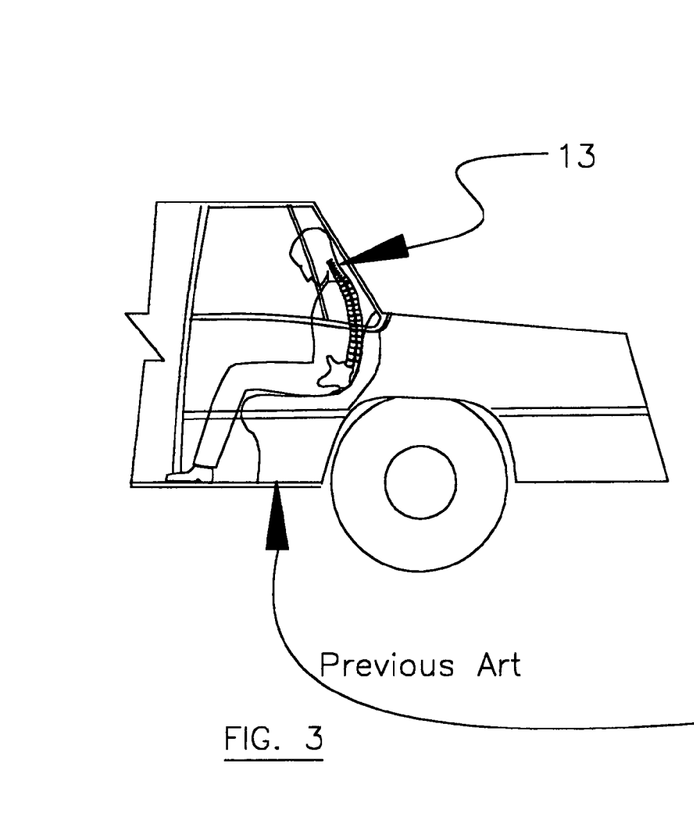
FIG. 3 is more detailed side section of typical pontoon fuselage rear compartment which illustrates passenger's backbone position.

At FIG. 1 schematic side section view of a conventional fuselage, comprising the front plate from 1 to 2, upper plate from 2 to 3, rear plate from 3 to 4, bottom plate from 4 to 1 show the airflow separation L1 and L2 from the imaginary point of separation D, to the imaginary point of reintegration U. The value of air pressure F1 on the top and F2 on the bottom of the fuselage shall be in the direct ratio to the value of an air density P over the fuselage area A; and similarly at the inverse ratio to the flows speed V, and to the fuselage area A with its length of air flow L, from area of flows separation to the area of their reintegration (time T is equal for both):

P=F/A; Where:
L1>L2; then: A1>A2; also: V1>V2; (L=VT; T1=T2;)
P1<P2; accordingly Bernoulli's Principle; Therefore: F2>F1;

Resulting force: Fa(max)=F2−F1; this Fa(max) represents an Aerodynamic Lifting Force (Aerodynamic Lift, which affect contrary gravity force G to reduce it with minimizing contact between speeding vehicle and the road surface G−Fa(max)=G'; G'<G;

On FIG. 2 the improved fuselage of acute angle parallelogram shape in its side section presented with plates' numeration accordingly. Both acute angles of the body structure are the boundaries for fuselage front-upper (1-2-3) and bottom-rear (3-4-1) surfaces, which effected evenly by an airflow (L1 and L2) with miimizing the force of an Aerodynamic Lift, accordingly Bernoulli's Principle:

L1=L2; then: V1=V2; similarly: P1=P2; therefore: F2=/F1/; or: Fa(max)=F2−F1=0;

In this case: G'=G;

A negative Aerodynamic Lift may occur when due to the appropriate car's body configuration, a fuselage top will be designed more flat than a bottom:

L1<L2; (T1=T2;) then: V1<V2; hence: P1>P2; therefore: F2<F1;

G'=G+Fa(max); G'>G;

On FIG. 3 shown passenger's body position on conventional rear seat (14) inside typical passenger compartment, with backbone in tension (13).

On FIG. 4, placed right behind conventional seats (14) and the rear wheel booth (9) the improved rear seats are shown in details with three sections: (5) to support passenger feet and calve, (6) to support further to passenger's hamstrings and buttock, and (7) to be placed about parallel to the body front and rear plates as a back of the improved seats, therefore with improvement of backbone position(13). The rear seats able to rotate around horizontal axle (19) located at the rear seats' foremost frontal point whenever direction of strike by vehicle behind or its physical parameters do not allow improved fuselage to slide on top of radiator of said vehicle.

Figure 5:
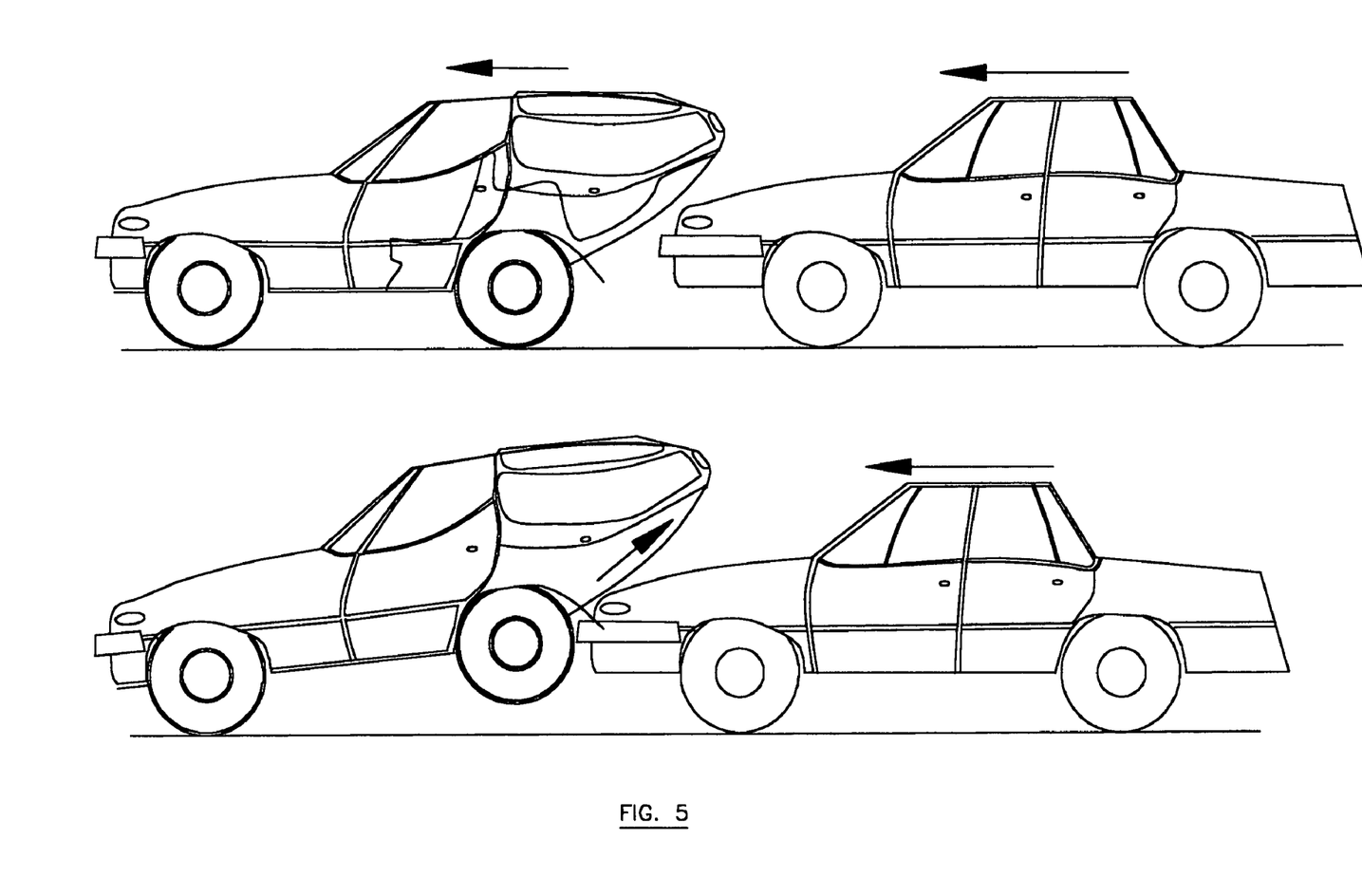
FIG. 5 shows a collision sketch, where the improved fuselage is getting stroked from behind, and slides along its back plate curvature on top of radiator behind.

On FIG. 5 collision is shown with a participant car bodies' movement direction and where the improved fuselage slides on top of the radiator striking from behind.

Figure 6:
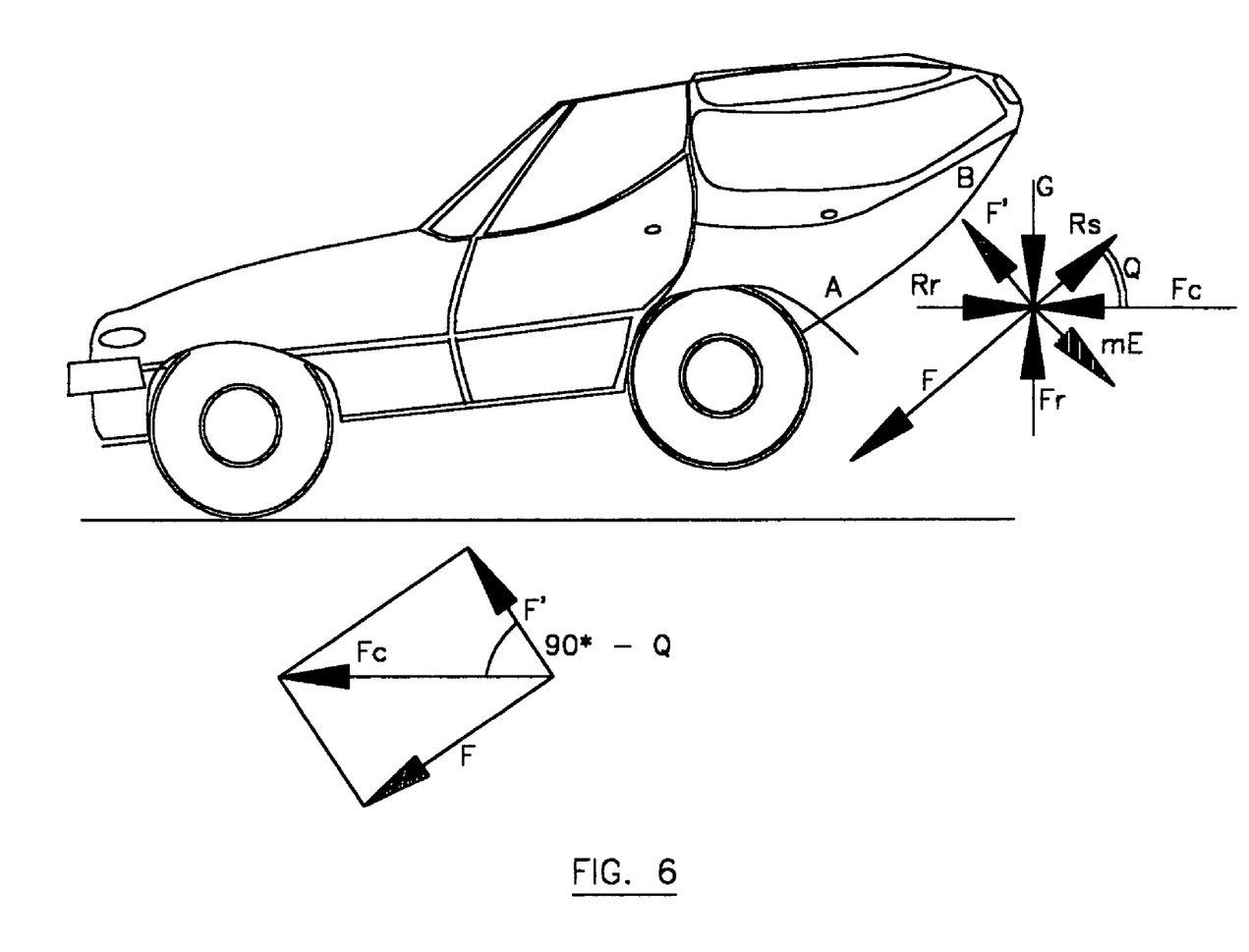

FIG. 6, shows collision forces resolution: a collision vector Fc founding a rolling resistance Rr on the sloped (angle Q) area at the fuselage rear surface 3-4 and being channeling by gravitation G and a road surface resistance Fr, resulting in bouncing down-forward as F and-up-forward as F'. (Fc=F+F'); A fuselage sliding resistance Rs is the smallest force to counteract against an attack from the rear in case the car's body durability mE will be large enough to exceed one: (Rs×G<mE).

F parallel to 3-4; F' perpendicular to 3-4; (where 3-4 is the fuselage rear surface slanted at an angle Q, the way its top is projected toward its back upward).

After striking surface 3-4, the Collision Force vector Fc is channeled toward vector F to slide along 3-4 (due to the sliding resistance Rs is the smallest force on the way). Rs<mE, where mE represents a car body's rear plate durability.

Then F', a part of Fc perpendicular to 3-4 (Fc-F=F'), during the time of the collision(t) is distributed along surface 3-4, minimizing the force's F' impact on the initial point of contact with the fuselage.

Therefore it is available option to exclude possibility of the vehicle's rear plate crushing. For this its or the chock absorbers (16) durability (mE) is made strong enough to withstand the maximal.

Since the vector of a Collision Force (Fc) directed to approach surface of the car body's rear plate on a sharp angle, it will never crush this fuselage:

Fc=F'sinQ; F'=Fc cscQ; mE>Fc(t)cscQ;

Any collision force will only lift the improved fuselage higher up.

Figure 7:
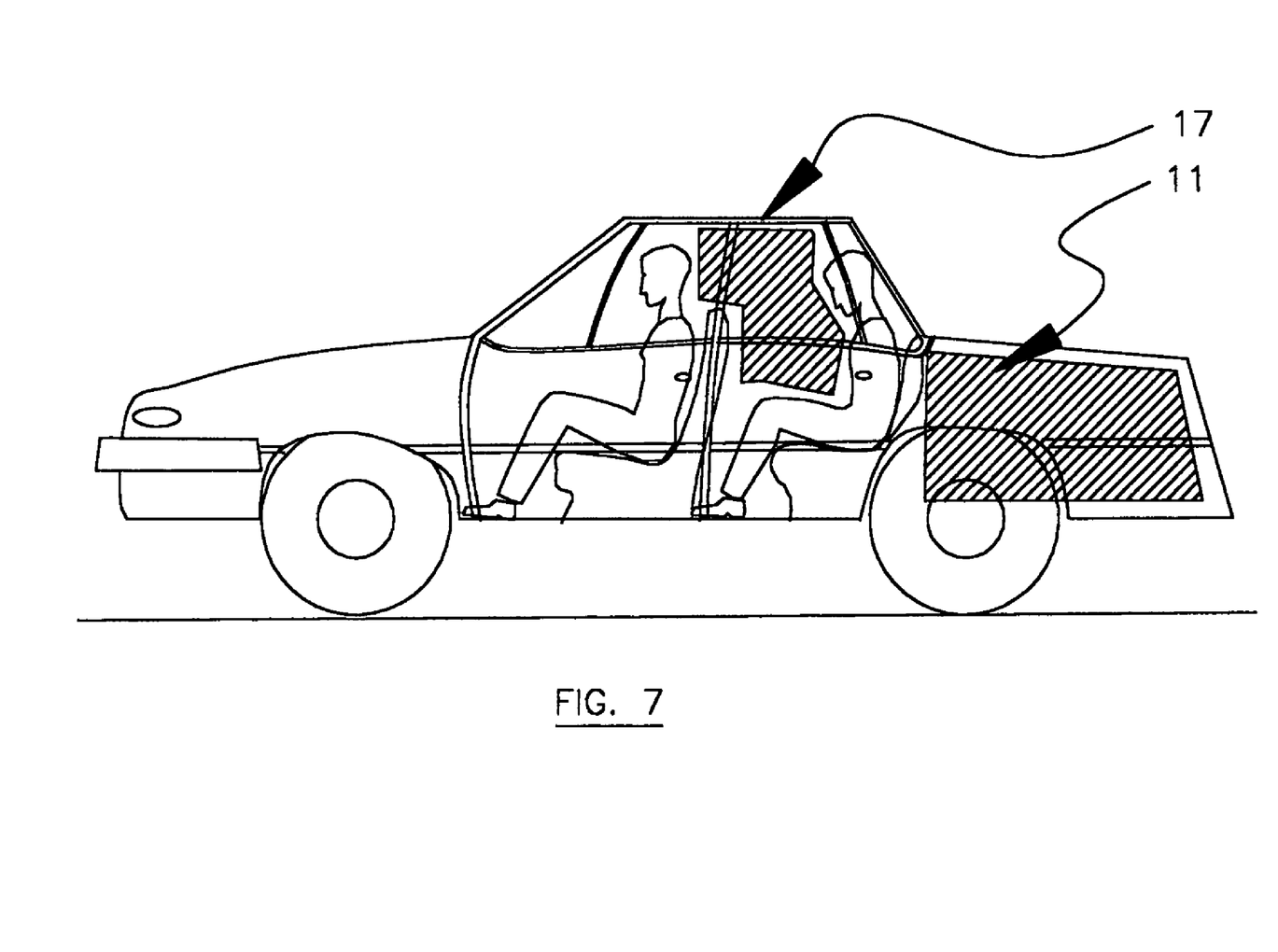
FIG. 7 indicate typical location and size of conventional passenger compartment's volume used for secondary function (i.e. luggage place, accident body buffer zone).

FIG. 7 illustrate passenger's compartment unused space (17) and trunk (11) volume.

Figure 8:
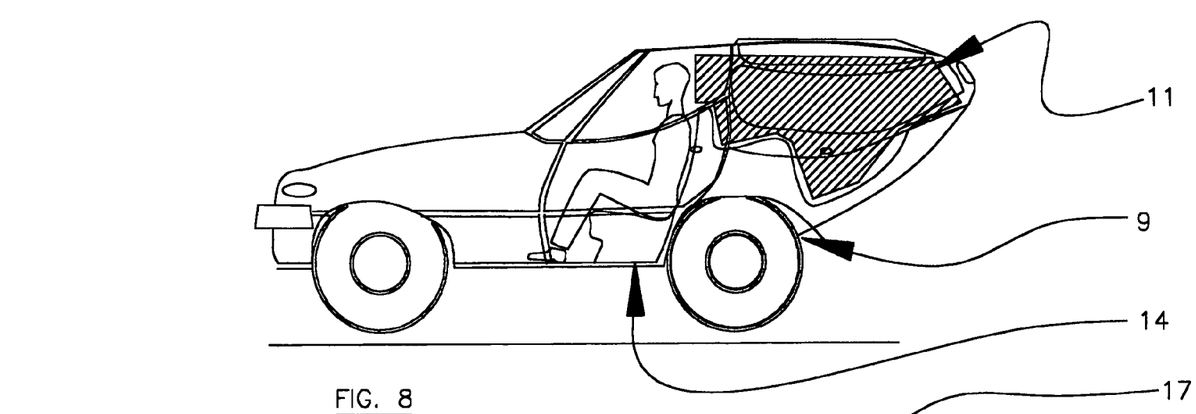
FIG. 8 indicate improved passenger compartment volume used as trunk

FIG. 8 illustrate the advantage of over existing car body types of new combination of trunk with passenger compartment (11), placed right behind the conventional seats (14) and the rear wheel booth (9).

Figure 9:
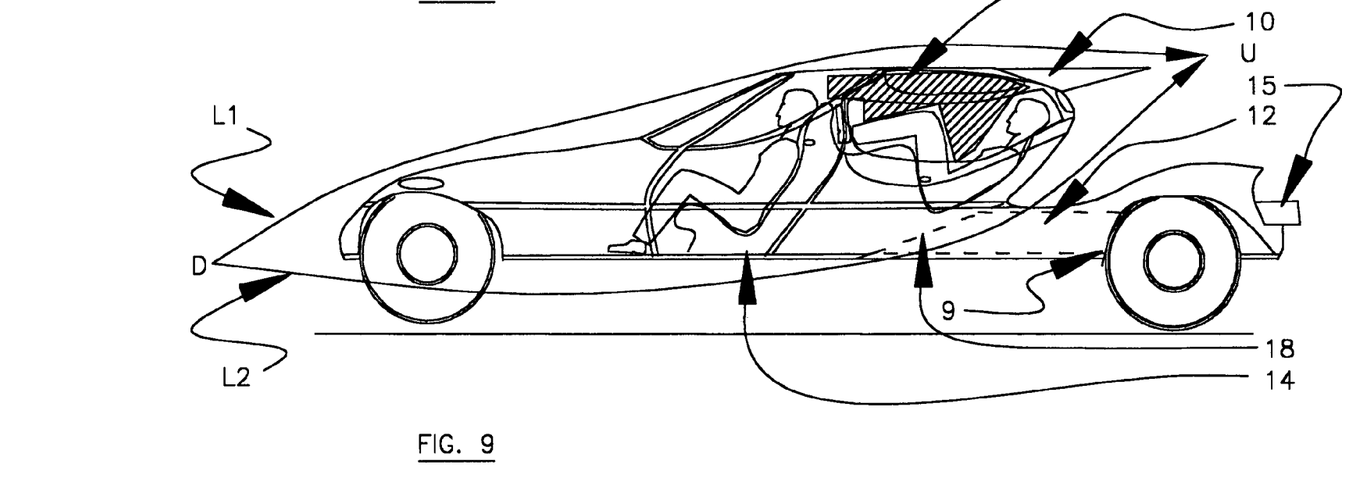
FIG. 9 illustrate embodiment of this invention with spoiler attached to upper plate and with rear wheel booth on the wheel frame extenuation placed behind the fuselage of previous description, and indicate improved passenger compartment volume used for accident body buffer zone.

FIG. 9 illustrate the advantage over existing car body types of the combination of trunk with passenger compartment (17) on the improved fuselage with one conventional seats row(14), and rear wheel booth (9) on the extended wheel frame (12) with the rear bumper (15), having spoiler (10) attached to fuselage top, or otherwise spoiler (10) made as a part of one, for increasing the bottom-rear body surface to elongate the lower airflow L2, coming between wheels' frame rear (12) and between the rear wheel booth (9) and fuselage surface (18).

Figure 10:
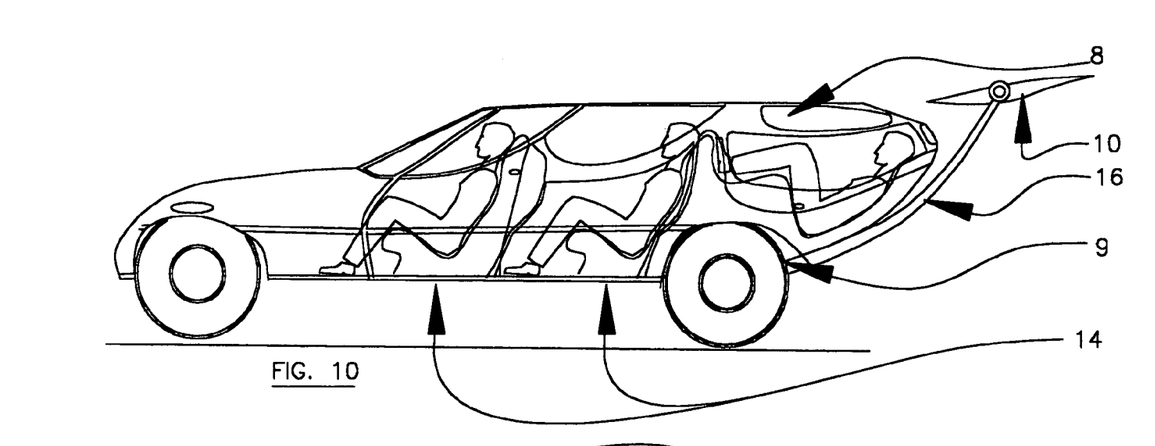
FIG. 10 illustrate preferable embodiment of this invention with one extra conventional seats row and vertical chock absorbers FIG. 11 illustrate preferable embodiment of this invention from behind with open rear door.

FIG. 10 illustrate the disclosed fuselage embodiment with one extra conventional seats row (14), vertically operated rear door (8), and with vertical chock absorbers (16), having attached spoiler (10).

Figure 11:
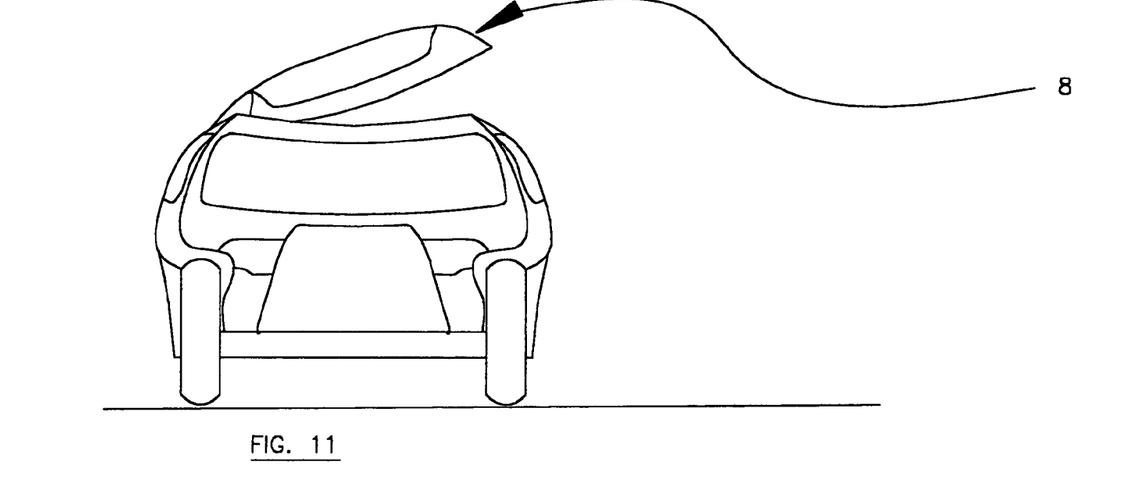

On FIG. 11 the sketch of the preferred embodiment from behind the rear door (8) open vertically along the longitudinal axes at the left side of the fuselage's passenger rear compartment. The presence, location, and type of such a doors is optional.

All embodiments disclosed at FIGS. 9–11 and other similar modifications of the shown on FIG. 2 and defined in details earlier as the vehicular body of acute angle parallelogram shape in its side section are optional and not deprive from the scop of said vehicle features.

On the sketch of the preferred embodiment on FIG. 9, the rear door(s) 6 open vertically about hinges 7 located along the longitudinal axes in the middle of the car's roof or otherwise at the left side of the fuselage's passenger rear compartment.

Numerous modifications, variations and alterations may be made to the specific embodiment of the invention herein above described, without departing from the scope of the invention as defined as follows:

We claim:

1. A fuselage of an automobile comprising:
   said automobile fuselage of an acute angle parallelogram shape in its side cross-section,
   a top plate projected horizontally straight backward,
   a bottom plate limited by a last row of conventional seats,
   a rear wheel booth, placed at an end of bottom plate,
   a body rear plate mounted at an acute angle to horizontal axis upward toward fuselage back to be about parallel to the front plate,
   rear seats comprising three parts, wherein a first part running from the last conventional seats row about horizontally backward, a second part running down nearly vertically, and a third part running upward to automobile rear about parallel to said automobile fuselage rear plate to be the back of said seats.

2. The fuselage of an automobile of claim 1 further comprising extra conventional seats rows.

3. The fuselage of an automobile of claim 1 wherein the wheel booth, placed at a wheel frame extenuation with a space between the wheel booth and the fuselage rear and bottom plates.

4. The fuselage of an automobile of claim 1 further comprising spoilers attached to the top plate.

5. The fuselage of an automobile of claim 1 with the top plate projected backward over the rear plate upper end.

6. The fuselage of an automobile of claim 1 further comprising a vertical shock absorbers with spoiler.

7. The fuselage of an automobile of claim 1 comprising its rear seats rotated around a horizontal axle located at the rear seats foremost frontal point.

* * * * *